(12) United States Patent
Kenna et al.

(10) Patent No.: US 6,345,645 B1
(45) Date of Patent: Feb. 12, 2002

(54) FLUID DISTRIBUTION VALVE

(75) Inventors: Michael Kenna, Mesa, AZ (US); Jon Ward, Reston, VA (US); Michael Farrier, Lakeside, AZ (US); Steven Wallace, Arlington, VA (US)

(73) Assignees: Caretaker Systems, Inc., Scottsdale, AZ (US); S.A.I.C., McClean, VA (US)

( * ) Notice: Subject to any disclaimer, the term of this patent is extended or adjusted under 35 U.S.C. 154(b) by 0 days.

(21) Appl. No.: 09/452,350

(22) Filed: Dec. 1, 1999

(51) Int. Cl.[7] ............................................... F16K 11/00
(52) U.S. Cl. .............................. 137/625.11; 137/624.13; 137/625.19
(58) Field of Search ....................... 137/625.11, 625.23, 137/625.47, 454.6, 625.22, 625.46, 624.11, 624.13

(56) References Cited

U.S. PATENT DOCUMENTS

| | | | |
|---|---|---|---|
| 2,642,076 A | 6/1953 | Tigert | |
| 3,779,269 A | 12/1973 | Gould | |
| 4,077,424 A | 3/1978 | Ehret | |
| 4,086,933 A | 5/1978 | Pansini | |
| 4,313,455 A | 2/1982 | Pitman | |
| 4,354,524 A | 10/1982 | Higgins | |
| 4,570,663 A | 2/1986 | Gould | |
| 4,592,379 A | 6/1986 | Goettl | |
| 4,601,307 A | 7/1986 | Johnson | |
| 4,817,656 A | 4/1989 | Gould | |
| 5,207,354 A | 5/1993 | Hsu | |
| 6,169,266 B1 * | 3/2001 | Breda | 137/625.11 |

* cited by examiner

Primary Examiner—Kevin Lee
(74) Attorney, Agent, or Firm—LaValle D. Ptak (57) ABSTRACT

A water distribution valve, ideally suited for distributing water from a recirculating pump of a swimming pool to selective outlet lines, is designed with a main housing in the form of an outer cylindrical section. This main housing has outlet ports located through the peripheral surface thereof at equal angular spaced intervals. These outlet openings are located in a plane which is perpendicular to the central axis of the main housing. A fluid distribution member, in the form of a T-shaped body, is rotatably mounted inside the main housing member. The base or stem of the T is connected with a water inlet; and one arm of the T has a fluid delivery opening in it for delivering water from the inlet through the opening. The fluid delivery opening in the arm is designed for mating alignment with a selected one of the outlet openings in the main housing; so that when the T is rotated into alignment with one of these openings, water is delivered from a pump, through the inlet, to the fluid delivery opening and from there, through the selected fluid outlet opening in the main housing.

32 Claims, 6 Drawing Sheets

FLUID DISTRIBUTION VALVE

BACKGROUND

Fluid distribution valves for distributing the water from the recirculating pump of a swimming pool, or the like, to selected ones of outlet ports for operating banks of cleaning heads are in widespread use in conjunction with modern swimming pools. These cleaning heads have made it possible to build pools which require little or no maintenance to remove dirt and other debris, such as leaves and the like, from the pool. The cleaning heads allow this to be accomplished automatically.

Conventional water distribution valves for such self cleaning pool systems typically employ five or six outlet ports, with a single inlet port. All of the ports in most of these conventional water valves are located in the bottom of the valve body. As disclosed patent U.S. Pat. No. 3,405,733 to Hanson, U.S. Pat. No. 4,570,663 to Gould, U.S. Pat. No. 4,313,455 to Pittman, and U.S. Pat. No. 4,592,379 to Goettil, pistons or balls have been used to open or close outlet ports leading to the pool. A cam or other member, operated under control of the movement of water through the inlet of the valve body, is rotated to selectively open one of the inlet ports at a time, with some overlap as the valve changes from one outlet port to another. The dwell time is dependent on the flow rate of water through the valve body.

A significant disadvantage of the conventional water valve described above is that the main valve body is pressurized by the water entering through the central inlet port in the bottom of the valve body. As a consequence, the main valve body must be designed to withstand the rather significant pressure which exists in swimming pool recirculation systems. In addition, a significant pressure drop takes place due to the large size of the inner valve chamber and the restricted water flow through the outlet port. This is undesirable, since the retractable or pop-up pool heads with which such systems are used operate most effectively under the greatest amount of pressure which can be applied to them through the pool cleaning system. If significant pressure drops occur, the efficiency of the pool cleaning heads themselves suffers. In efforts to compensate for the pressure drops, larger capacity pumps are required than would be the case if such large pressure drops did not take place. All of this results in increased forces operating on the valve interior, and increased costs resulting from the requirement for using larger pumps for delivering water flow under greater pressure.

In addition to the relatively large pressure drops associated with the use of pistons or balls to open and close the outlet ports, substantial bypass flow takes place when one outlet port is in the process of being closed and the next successive one is in the process of being opened. When the valve is in this intermediate condition of operation, reduced flow takes place through both of the outlet ports, since the amount of water supplied through the inlet is being split between two outlets.

In addition to the disadvantages noted above, it is possible for water in the large inner chamber of these valves to become stagnant in areas, since there is not a direct fluid flow from the inlet to the outlet. The water which is present in the valve housing to provide the pressure necessary for operation of these valves possibly can develop regions where it becomes stagnant.

Another general type of water distribution valve which has been designed for pool cleaning systems and other similar systems also involves the use of a valve outer body with a plurality of outlet ports and a center inlet port on the bottom of the valve system. Inside the valve body, a center disk with an outlet hole in it rotates over the various outlet ports to provide a sequential or selective flow of water from the inlet to the desired outlets. United States Patents which generally show this type of a system are U.S. Pat. No. 2,642,076 to Tigert, U.S. Pat. No. 3,779,269 to Gould and U.S. Pat. No. 4,077,424 to Ehret. As can be noted from the above patents, a water wheel gear arrangement, or an external gear drive arrangement, is used to rotate the center disk for effecting the water distribution. A significant problem exists with respect to this type of a valve, however. Again, as in the case of the prior art valves discussed above, when these valves operate, the entire housing interior is pressurized. This causes the internal forces to act downwardly on the center disk. The load on the center disk pushes it downward against the sealing rings around the outlet openings. Because of the large surface area of the center disk, a large amount of downward force acts against the disk. As a consequence, in order to rotate the center disk, these large load factors must be overcome. Thus, such valves have not proven to be practical in use; although from a theoretical standpoint, they would appear to be a relatively straightforward, simple solution for effecting sequential distribution from a single inlet.

It is desirable to provide a water distribution valve which overcomes the disadvantages of the prior art, as noted above, particularly one which is capable of passing water from its inlet to the outlet port with little pressure drop or bypass flow, which is capable of operation with a reduced amount of friction, and which quickly may be stepped from one position to another.

SUMMARY OF THE INVENTION

It is an object of this invention to provide an improved fluid distribution valve for directing fluid from a fluid inlet to a selected one of a plurality of fluid outlets.

It is another object of this invention to provide an improved fluid distribution valve for directing fluid from a fluid inlet to a selected one of a plurality of fluid outlets with reduced pressure drop.

It is an additional object of this invention to provide an efficient fluid distribution valve for. directing fluid from a fluid inlet to a selected one of a plurality of outlets.

It is a further object of this invention to provide a water distribution valve for swimming pool cleaning systems, for directing fluid from a generally T-shaped fluid distribution member having a fluid inlet coupled to the base of the T and having a fluid outlet through one arm of the T, with the distribution taking place at selected outlet openings in the periphery of a main housing in the form of an outer cylindrical section.

In accordance with a preferred embodiment of the invention, a fluid distribution valve for directing fluid from a fluid inlet to a selected one of a plurality of fluid outlets includes a main housing. The main housing is constructed in the form of an outer cylindrical section. A plurality of fluid outlet openings are located at predetermined spaced locations about the periphery of the main housing. A fluid distribution member is rotatably mounted inside the main housing member. The fluid distribution member has a fluid inlet, and is located for rotational movement into alignment with a selected fluid outlet opening in the main housing to deliver fluid from the fluid inlet to the selected fluid outlet of the main housing.

DETAILED DESCRIPTION

Reference now should be made to the drawings, in which the same reference numbers are used throughout the different figures to designate the same or similar components. The preferred embodiment of the invention is a water distribution valve ideally suited for use with automatic pool cleaning systems having multiple banks of cleaning heads. The distribution valve which is illustrated in the various figures of the drawings operates efficiently and effectively, without subjecting the outer housing of the valve to internal high water pressures, and which requires substantially less force to operate than prior art valves.

Figure 10:
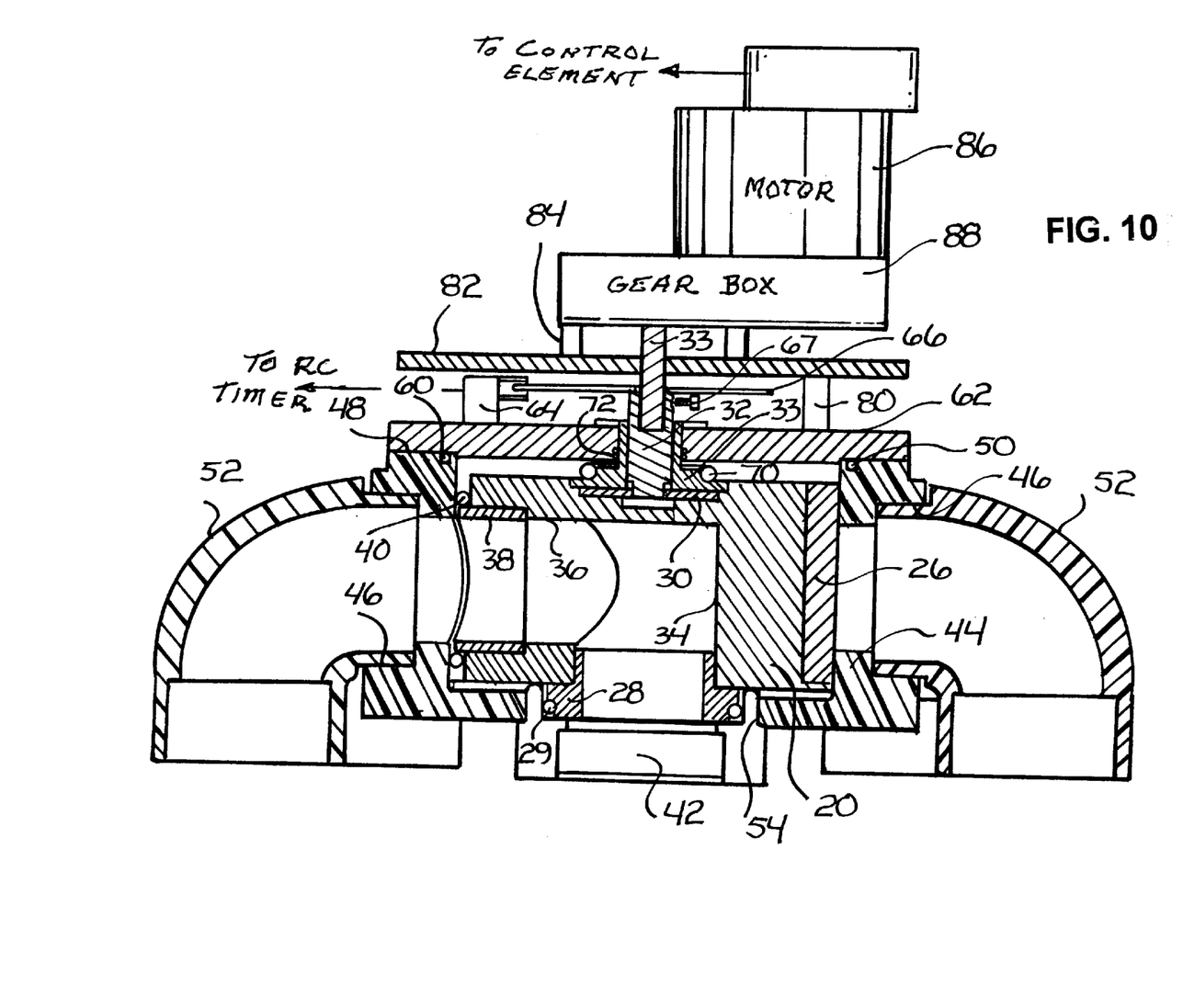
FIG. 10 is a cross-sectional view of an assembled preferred embodiment of the invention.

Throughout the ensuing description, when reference is made to particular figures, reference continually should be made to FIG. 10, which is a cross-sectional view of a fully assembled preferred embodiment of the invention, and which illustrates the interrelationship and arrangement of the various parts which are shown separately and in different combinations throughout the other figures.

Figure 1:
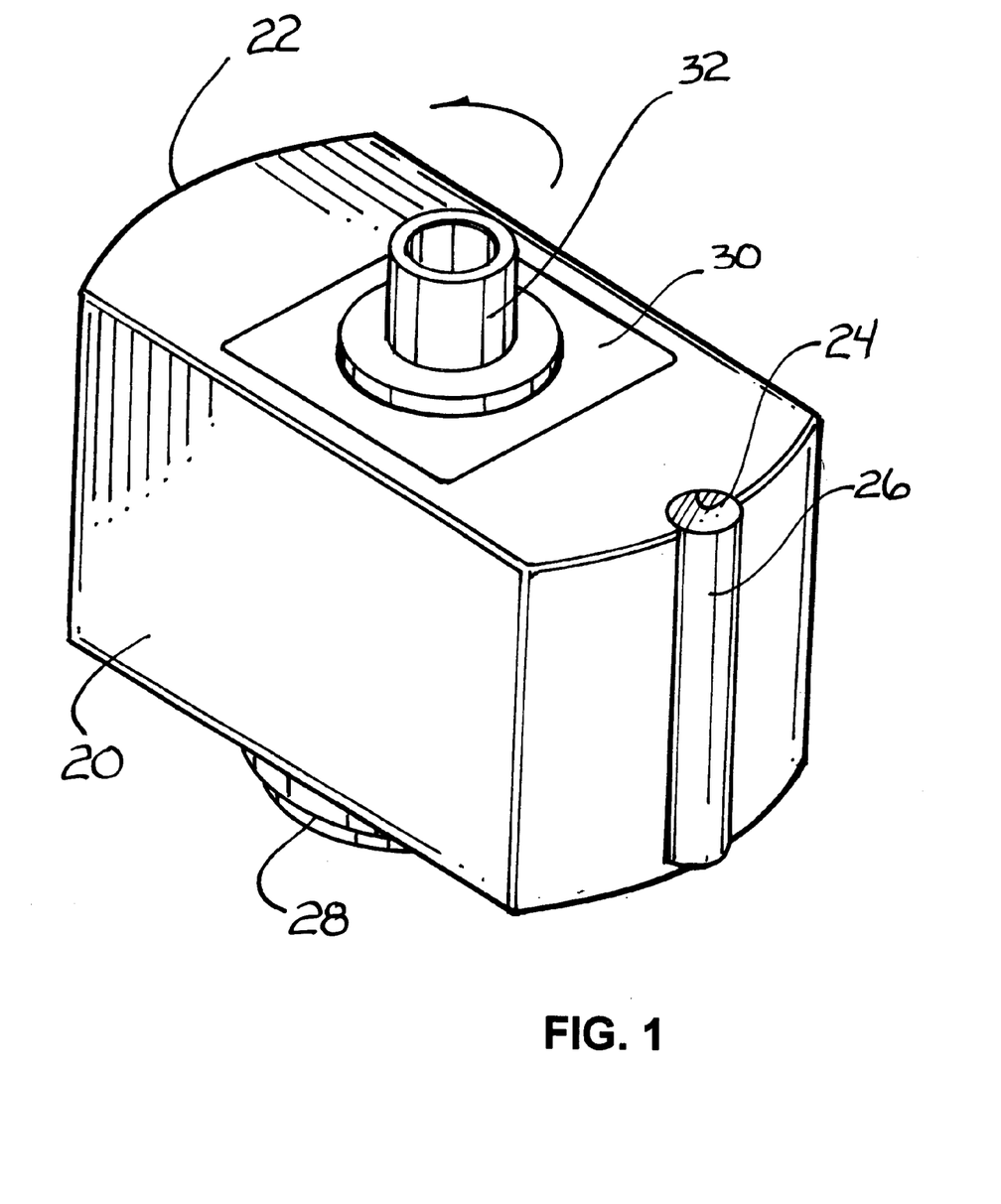
FIG. 1 is an enlarged perspective view of a portion of a preferred embodiment of the invention.

FIG. 1 is a top perspective view of a fluid distribution member 20, which constitutes a core element of a preferred embodiment of the invention. The fluid distribution member 20 is rotatably mounted, as indicated by the arrow in FIG. 1, inside a main housing 44 (shown most clearly in FIGS. 4 through 8) for rotation within the main housing 44 about the central axis of the main housing. As is readily apparent from an examination of FIGS. 4 through 8, the main housing 44 is in the form of a section of a hollow cylinder. The fluid distribution member or water distribution member 20 and the main housing 44 both are manufactured of high-impact plastic material, which may be of the type commonly used for water distribution valves employed in conjunction with the automatic cleaning systems of swimming pools and the like.

Figures 2, 3, 5, 6:
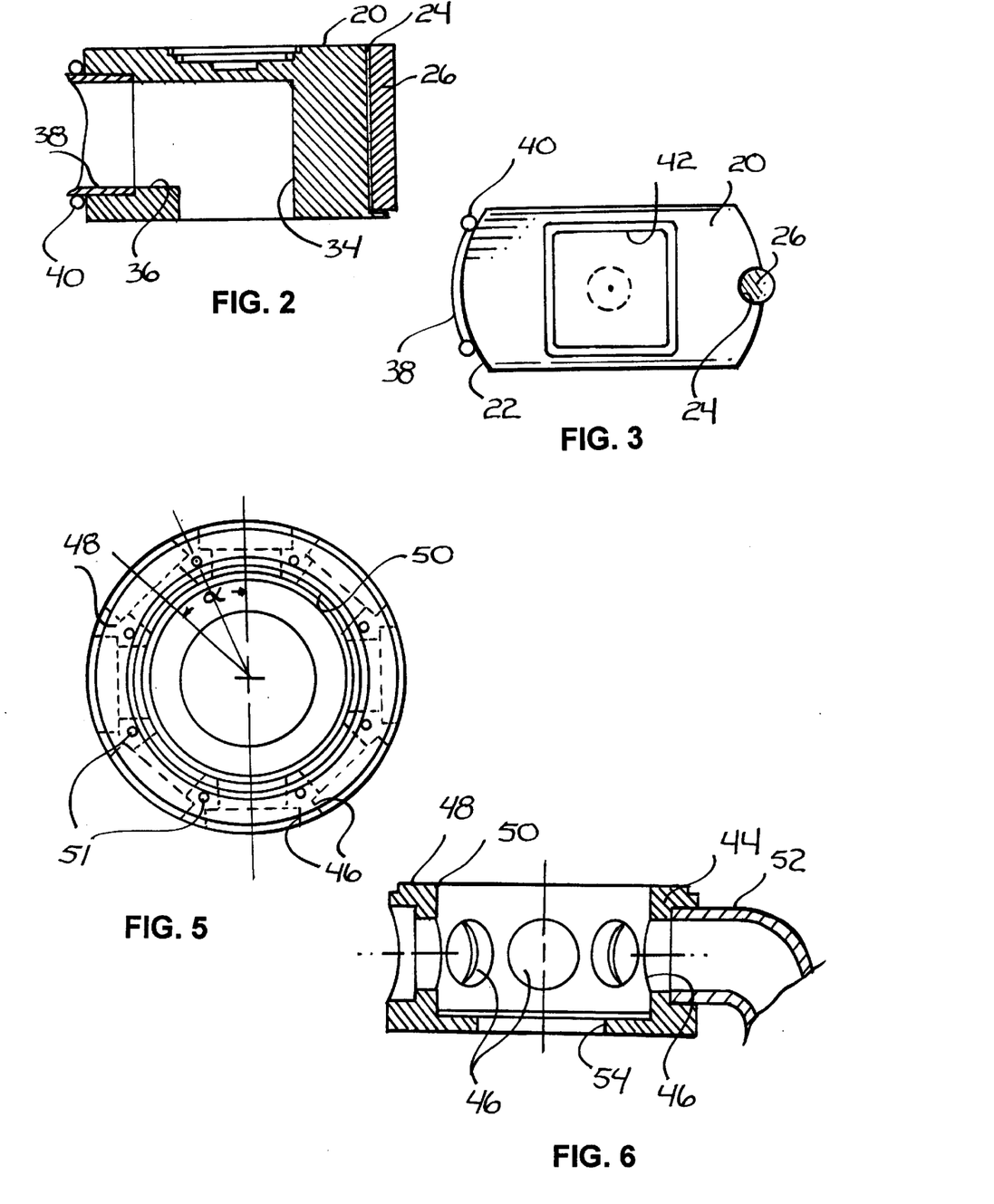
FIG. 2 is a cross-sectional view of the portion shown in FIG. 1.
FIG. 3 is a top view of the portion shown in FIG. 1.
FIG. 5 is a top view of a portion of one of the components shown in FIG. 4.
FIG. 6 is a cross-sectional side view of the component shown in FIG. 4, illustrating further details thereof.

The fluid distribution member 20 illustrated in FIG. 1 and shown in cross section in FIG. 2 and in a top view in FIG. 3, essentially has an internal shape in the form of a "T", with the downwardly depending hollow leg section 34 designed to be connected to a water inlet pipe 28, which in turn is rotatably connected to a source of water or other fluid through a watertight rotatable coupling 42. Typically, the water which is supplied to the fluid distribution member 20 is obtained from the recirculating pump used in conjunction with a swimming pool cleaning system. This pump and the remainder of the swimming pool cleaning system are well known, and for that reason, have not been shown in the drawings.

The top of the "T" of the fluid distribution member 20 has two arms located on opposite sides of its central axis. As shown in FIGS. 2 and 3, the left-hand arm is hollow, and has a circular aperture 36 cooperating with the water inlet 34 to deliver water from the inlet 34 through the water fluid delivery opening 36. The opening 36 has a shoulder located about its periphery; and a fitting 38, comprised of a short length of circular pipe, is secured in it, as illustrated most clearly in FIG. 2. This fitting 38, as shown in FIG. 3, is cut with a curvature (looking directly downward from the top) which conforms to the inner diameter of the hollow outer or main housing 44. A circular O ring 40 is secured around the delivery pipe 38 to provide a watertight seal between the end 22 (and delivery pipe extension 38 of the distribution member 20) and the interior cylindrical surface of the hollow main housing member 44. This engagement is shown most clearly in the cross section of FIG. 10.

On the end of the other arm of the "T" forming the fluid distribution member 20, there is a vertical cylindrical groove 24. An elongated cylinder 26, comprising a friction bar made of ultra-high molecular weight (UHMW) polyethylene material, is placed in this groove 24 to freely rotate therein. When the fluid distribution member 20 is assembled inside the main housing 44, the bar 26 rides on the interior surface of the main housing 44 (as shown most clearly in FIGS. 4 and 10) to counteract and balance the force of water exiting through the fluid delivery opening 36/38, and from there, into a selected one of a plurality of fluid outlet openings 46 in the main housing 44.

From an examination of FIGS. 1, 2, 3 and 10, it is readily apparent that the bar 26 is located 180° opposite the center of the fluid delivery opening 36/38 in the other arm of the T-shaped fluid distribution member; so that the forces applied to the interior of the main housing 44 as a result of the high-pressure water flow through the distribution member 20 are equally distributed on opposite sides of the housing 44. It also is readily apparent from an examination, particularly of the cross-sectional view in FIG. 10, that there is no water pressure inside the hollow interior of the main housing 44, since no water enters the main housing. All of the water which is distributed by the valve illustrated in the drawings flows through the inlet couplings 42 and 28 into the hollow stem 34 of the T-shaped distribution member 20, and then exits through the delivery opening 36. The opposite arm of the water distribution member 20 is solid, as shown most clearly in the cross section of FIG. 2.

As shown in FIGS. 6 and 10, each of the eight fluid outlet openings 46 of the main housing 44 are designed to receive a plastic fitting 52, which is secured against the shoulder in each of the openings 46, as shown most clearly in FIGS. 6 and 10. The manner in which these L-shaped fittings 52 are secured is conventional, and typically is effected by means of PVC cement or other suitable watertight fasteners. Although the water distribution valve which is illustrated shows eight distribution outlet openings 46, each spaced equi-angularly by an angle a, a lesser number or greater number of outlet openings 46 may be included in any particular system. Because of the low pressure nature of the operation of the system which is illustrated, however, it is possible to use a relatively large main housing 44 with a large number of openings, such as the eight which are illustrated, without requiring the design of an outer housing capable of withstanding extreme pressures, since no water pressure exists within the housing 44 during its operation.

Figure 4:
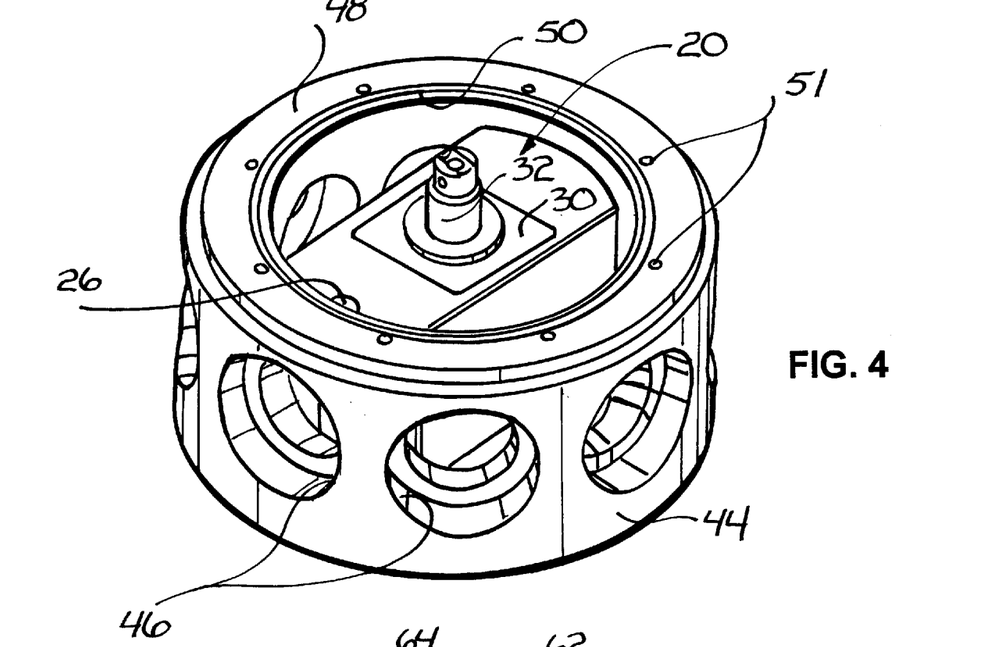
FIG. 4 is an enlarged top perspective view of basic parts of a preferred embodiment of the invention.

Referring now to FIGS. 1, 4 and 10, it should be noted that a square receptacle 42 (FIG. 3) is formed in the top of the distribution member 20 to receive a square metal plate 30, which in turn has a square hole in its center for receiving a drive shaft 32. The shaft 32 in turn is coupled to the motor drive shaft 33 from a gear box 88 (FIG. 10) to rotate the distribution member 20. The metal plate 30 is employed to more widely distribute the stress which is applied by means of the relatively small diameter drive shaft to avoid premature. wear or slippage, which might otherwise result if the drive shaft were coupled directly to the plastic material out of which the distribution member 20 is made. The top 48 of the main cylindrical housing 44 has a number of evenly spaced fastener holes 51 located in it, and it also has a circular recess 50 for receiving an O ring 60 (see FIG. 10). After the O ring 60 is inserted, a plate 62 is placed over the top 48 of the main cylindrical housing 44, and is secured by means of fasteners applied through matching holes in the plate 62 and identified also by the reference number 51 in FIGS. 7 and 8.

Figure 7:
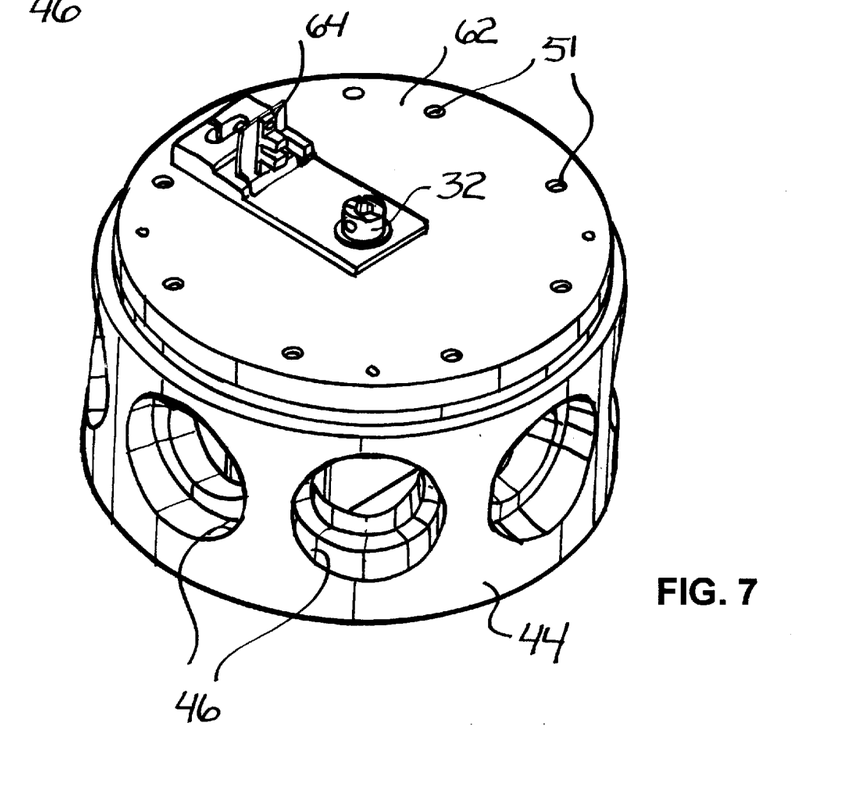
FIG. 7 is a top perspective view of the embodiment shown in FIG. 4 with additional parts added.
Figure 8:
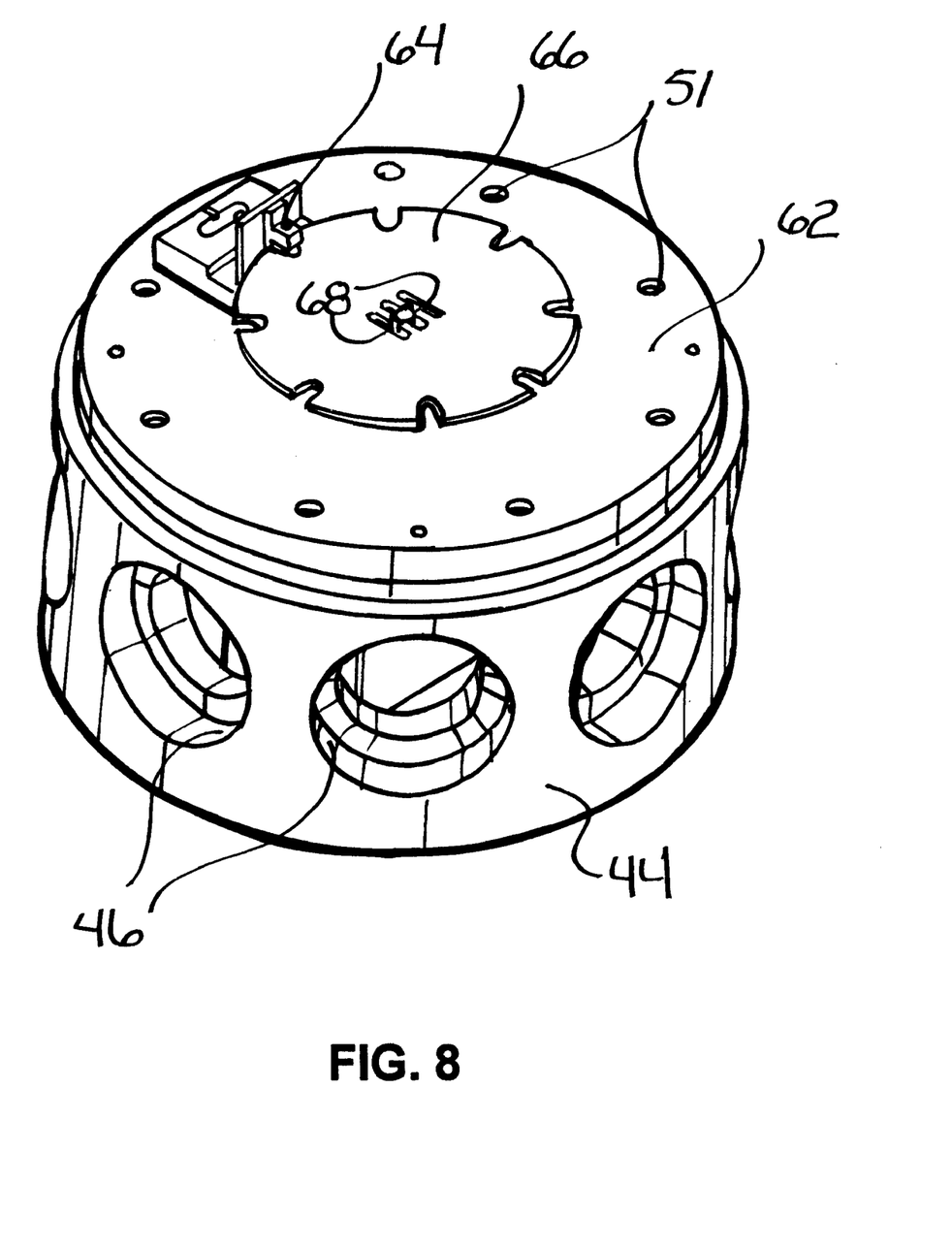
FIG. 8 is a top perspective view of the portion of the embodiment shown in FIG. 7 with additional elements added.

As shown in FIG. 7, the shaft 32 extends through the plate 62; and it includes a pair of parallel, upwardly extending ears on it for engaging a position sensor wheel 66. This is shown attached to the ears on the shaft 32 in FIG. 8, through corresponding slots 68 in the wheel 66. As shown in both FIGS. 7 and 8, a valve position sensor 64, in the form of a photoelectric switch, is provided to sense notches on the outer circumference of the sensor wheel 66 for utilization in control of the stepped rotation of the fluid distribution member 20, as described in greater detail subsequently. FIGS. 7 and 8 illustrate the mechanical positioning of the sensor 64 which may be any suitable type of photoelectric sensing switch designed to provide a signal when the leading edge of each of the notches on the sensor wheel 66 passes between the space in the two projections illustrated for the switch 64 in FIGS. 7 and 8, and also shown in FIG. 10.

The remainder of the assembly now is illustrated in cross section in FIG. 10. Another support plate 82 is mounted on a plurality of pillars 80, which are located at spaced intervals about the top of the plate 62, to space the plate 82 above the sensor wheel 66 and above the photoelectric sensor elements 64, as shown in FIG. 10. A drive shaft 33, from a gear box 88, which is supported on the top of the plate 82 by means of pillars 84, extends into a recess in the center of the shaft 32. The shaft 33 is secured to the shaft 32 by means of a set screw 69, or any other suitable fastener.

Rotation of the fluid distribution member 20 is effected by an electric motor 86, which operates through a gear box (typically a 200-to-1 gear ratio drive reduction) to effect stepped rotation of the distribution member 20 within the interior of the main housing 44.

It should be noted that the sensor wheel 66 has eight notches about its periphery, which are each aligned with a corresponding one of the eight fluid outlet openings 46 in the main housing 44. Thus, when one of these. notches is sensed by the photoelectric sensing switch 64, the positional location of the fluid distribution member with respect to a respective one of the fluid outlet openings 46 is precisely known.

Figure 9:
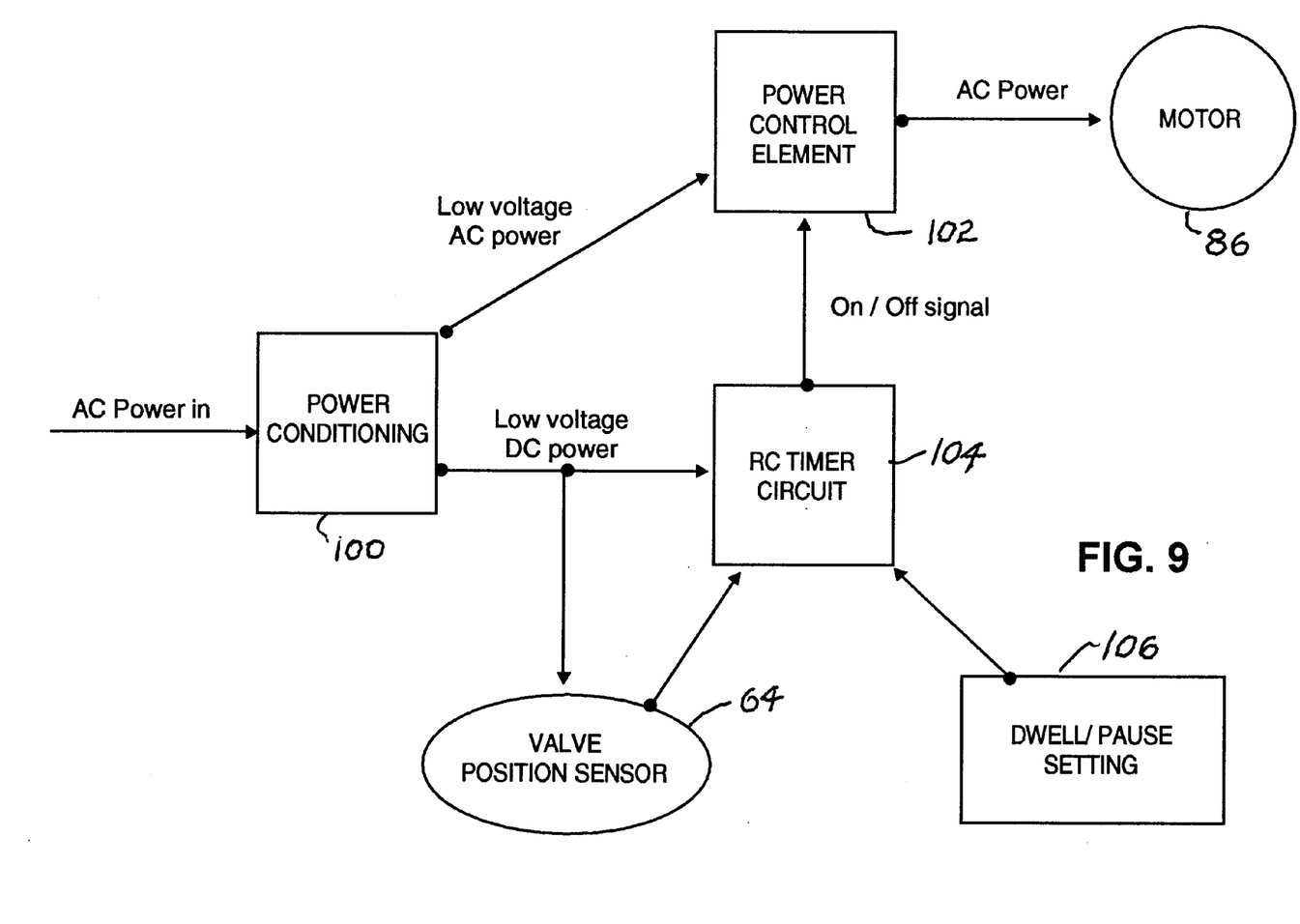
FIG. 9 is a schematic diagram of a control circuit used in conjunction with the embodiment shown in FIGS. 1 through 8.

The control of the rotation of the distribution member 20 is effected by means of the circuit shown in FIG. 9. Alternating current power is supplied to a power conditioning circuit 100 of a conventional type, which supplies low voltage alternating current power to a power control element or switch 102. The power control element 102 then supplies alternating current operating power to the motor 86. Whenever power is supplied from the power control element to the motor 86, the motor 86 operates to rotate the distribution member 20 through the gear box 88 and the shafts 33/32 described above. If nothing more was present in the system, the fluid distribution member 22 would continuously rotate and supply fluid from the delivery opening 36 to respective ones of the outlet openings 46, and from there through the output L's 52, to deliver water to the various water lines connected to the valve system. Such operation would be comparable to that of the prior art devices, which use a continuously changing or rotating cam or disk to deliver fluid from one to the next, to the next, of the plurality of fluid outlet openings 46, with a great deal of pressure drop and efficiency from application of fluid to adjacent pairs of outlet openings. This is one of the primary disadvantages of prior art fluid distribution valves. This is not the way in which the system disclosed here operates.

The remainder of the circuit of FIG. 9 is employed to cause the motor 86 only to operate as a stepping motor at established time intervals to quickly rotate the fluid distribution member 20 from one of the fluid outlet opening positions 46 to the next adjacent one. Once this is done, the rotation stops and the member 20 remains in that fixed position for the duration of a preset time interval, with the motor 86 turned off. This means that the shaft 33/32 does not turn most of the time of the operation of the system. The only time that the gear box 88 is driven by the motor 86 to rotate the shaft combination 36/32 is when a quick change from one outlet opening or port 46 in the main housing 44 to the next is desired. This is effected by means of the RC timer circuit 104 shown in FIG. 9.

The timer circuit 104 is supplied with low voltage DC power by the power conditioning circuit 100. At the end of each preset time interval, the timer 104 supplies an "on" signal to the power control 102 to momentarily cause operation of the motor 86 to step it from one position to the next. Since it is difficult to accurately position the fluid delivery opening 36 of the distribution member 20 with one of the openings 46 in the main housing 44 by means of empirically determined operating characteristics of the system, the valve position sensor 64 (described earlier) is employed. Thus, once the timer circuit turns on the motor 86 to rotate the fluid delivery member 20, rotation continues until the valve position sensor switch 64 senses the next notch in the sensor wheel 66. The switch 64 then sends a signal to the timer circuit 104 to reset it and send an "off" signal to the power control element 102, turning off the motor 86. The system remains in this condition until the RC timer circuit 104 once again times out with its preestablished time interval. The cycle then repeats. The distribution member 20 quickly rotates to the next position, and so on.

It should be noted that the system which operates in conjunction with the control circuit of FIG. 9 is capable of a variety of control characteristics which are not possible with the systems of the prior art. For example, an RC timer circuit 104 can be provided with a dwell-and-pause setting 106 by means of a manual adjustment in the form of an knob or slide switch. This can be used to vary the length of time fluid or water is delivered from the fluid distribution member 20 to the selected outlet opening or port 46, as determined by the pool owner. This control can be either preset at the factory, or made available for adjustment in the field at any time. It also is possible to provide a much more elaborate timer control, which can change the time out circuit intervals of the circuit 104 in accordance with each particular outlet or cleaning head bank which is being operated. For example, it is well known that the cleaning heads located in steps and benches of a swimming pool do not require the long time intervals which are most efficient for cleaning heads located in the bottom of the pool. It is possible, by means of the sensor wheel 66, to accurately know the position of the fluid distribution member 20 in accordance with each of the outlet openings 46 in the housing 44; so that a shorter time interval can be programmed in the timer 104 for operation of an outlet opening 46 coupled with a step and bench bank of cleaning heads than for cleaning heads located in other parts of the pool. Significant flexibility is available to the pool operator as a result of this system.

The foregoing description of the preferred embodiment of the invention should be considered as illustrative and not as limiting. Various changes and modifications will occur to those skilled in the art for performing substantially the same function, in substantially the same way, to achieve substantially the same result without departing from the true scope of the invention as defined in the appended claims.

We claim:

1. A fluid distribution valve for directing fluid from a fluid inlet to a selected one of a plurality of fluid outlets, the distribution valve including in combination:
    a hollow, outer cylindrical main housing having a plurality of fluid outlet openings therethrough at predetermined spaced locations about the periphery thereof;
    a fluid distribution member rotatably mounted inside the main housing, the fluid distribution member having a fluid inlet, and further having a fluid delivery opening located for rotational movement into alignment with a selected fluid outlet opening in the main housing to deliver fluid from the inlet of the fluid distribution member to the selected fluid outlet of the main housing;
    a drive member for rotating the fluid distribution member; and
    means for periodically operating the drive member to rotate the fluid member to cause the fluid delivery opening to be moved into alignment with different selected ones of the plurality of fluid outlet openings in the main housing.

2. The fluid distribution valve according to claim 1 wherein the main housing has a central axis therethrough and wherein said fluid distribution member is rotatably mounted about the central axis of the main housing.

3. A fluid distribution valve in accordance with claim 2 wherein the fluid being distributed is water and the outlet openings in the main housing are interconnected with water distribution pipes for operating a cleaning system of a swimming pool.

4. A fluid distribution valve according to claim 2 wherein all of the internal fluid pressure of fluid directed from the fluid inlet to a selected one of the fluid outlet openings is contained within the fluid distribution member; and no internal fluid pressure is present within the main housing.

5. The fluid distribution valve according to claim 4 wherein the fluid outlet openings of the main housing are radially located about the periphery thereof in a plane perpendicular to the central axis thereof.

6. The fluid distribution valve according to claim 5 wherein the fluid distribution member has the fluid inlet thereof aligned with the central axis of the main housing.

7. A fluid distribution valve in accordance with claim 1 wherein the fluid being distributed is water and the outlet openings in the main housing are interconnected with water distribution pipes for operating a cleaning system of a swimming pool.

8. A fluid distribution valve according to claim 7 wherein all of the internal fluid pressure of fluid directed from the fluid inlet to a selected one of the fluid outlet openings is contained within the fluid distribution member; and no internal fluid pressure is present within the main housing.

9. A fluid distribution valve according to claim 1 wherein all of the internal fluid pressure of fluid directed from the fluid inlet to a selected one of the fluid outlet openings is contained within the fluid distribution member; and no internal fluid pressure is present within the main housing.

10. A fluid distribution valve for directing fluid from a fluid inlet to a selected one of a plurality of fluid outlets, the distribution valve including in combination:
    a hollow, outer cylindrical main housing with a central axis and having a plurality of fluid outlet openings therethrough at predetermined spaced locations about the periphery thereof;
    a fluid distribution member rotatably mounted about the central axis inside the main housing member, the fluid distribution member having a fluid inlet, and further having a fluid delivery opening located for rotational movement into alignment with a selected fluid outlet opening in the main housing to deliver fluid from the inlet of the fluid distribution member to the selected fluid outlet of the main housing; wherein the fluid distribution member comprises a generally T-shaped member, with a vertical base having a top and a bottom with the fluid inlet in the bottom and first and second arms extending from the top of the base of the "T", the first arm including the fluid delivery opening, and the second arm being closed with the arms substantially extending across the diameter of the interior of the main housing; and
    a drive system for rotating the fluid distribution member within the main housing.

11. The fluid distribution valve according to claim 10 further including a device providing an indication to the timer circuit of the movement by the fluid distribution member into alignment with a selected one of the plurality of fluid outlet openings in the main housing.

12. A fluid distribution valve according to claim 11 further including a device for sensing the rotational position of the fluid distribution member with respect to the fluid outlet openings in the main housing.

13. The fluid distribution valve according to claim 10 wherein the fluid delivery opening in the first arm of the fluid distribution member further includes a sealing ring about the fluid delivery opening for engagement with the main housing to provide a fluid-tight seal between the main housing and the fluid distribution member.

14. The fluid distribution valve according to claim 13 wherein the T-shaped fluid distribution member is internally configured with a 90° fluid passage from the fluid inlet to the fluid delivery opening thereof in the first arm thereof, and with the second arm thereof being closed.

15. The fluid distribution valve according to claim 14 wherein the second arm of the T-shaped fluid distribution member is made of solid material.

16. The fluid distribution valve according to claim 15 further including a wear bar on the exterior of the second arm of the fluid distribution member for engagement with said main housing to counter forces generated by fluid passing through the fluid distribution member to the fluid delivery opening and to decrease friction between the second arm of the fluid distribution member and the main housing.

17. The fluid distribution valve according to claim 16 wherein the wear bar on the second arm of the fluid distribution member comprises an elongated cylinder located in a corresponding opening in the end of the second arm of the main housing and having an axis parallel to the central axis of the main housing.

18. The fluid distribution valve according to claim 17 wherein the wear bar is made of ultra-high molecular weight polyethylene material.

19. The fluid distribution valve according to claim 18 wherein the plurality of fluid outlet openings in the main housing are equally angularly displaced about the periphery thereof, and the fluid distribution member has a single fluid delivery opening in it for movement into alignment with selected ones of the fluid outlet openings in the main housing in accordance with the rotational position of the fluid distribution member.

20. A fluid distribution valve for directing fluid from a fluid inlet to a selected one of a plurality of fluid outlets, the distribution valve including in combination:

a hollow, outer cylindrical main housing having a plurality of fluid outlet openings therethrough at predetermined spaced locations about the periphery thereof;

a fluid distribution member rotatably mounted inside the main housing, the fluid distribution member having a fluid inlet, and further having a fluid delivery opening located for rotational movement into alignment with a selected fluid outlet opening in the main housing to deliver fluid from the inlet of the fluid distribution member to the selected fluid outlet of the main housing;

a drive member for rotating the fluid distribution member; and a timer circuit for periodically operating the drive member to rotate the fluid distribution member to cause the fluid delivery opening to be moved into alignment with different selected ones of the plurality of fluid outlet openings in the main housing.

21. The fluid distribution valve according to claim 20 further including a device providing an indication to the timer circuit of the movement by the fluid distribution member into alignment with a selected one of the plurality of fluid outlet openings in the main housing.

22. The fluid distribution valve according to claim 21 wherein the fluid outlet openings of the main housing are radially located about the periphery thereof in a plane perpendicular to the central axis thereof.

23. The fluid distribution valve according to claim 22 wherein the plurality of fluid outlet openings in the main housing are equally angularly displaced about the periphery thereof, and the fluid distribution member has a single fluid delivery opening in it for movement into alignment with selected ones of the fluid outlet openings in the main housing in accordance with the rotational position of the fluid distribution member.

24. A fluid distribution valve for directing fluid from a fluid inlet to a selected one of a plurality of fluid outlets, the distribution valve including in combination:

a hollow, outer cylindrical main housing with a central axis and having a plurality of fluid outlet openings therethrough at predetermined spaced locations about the periphery thereof;

a fluid distribution member rotatably mounted about the central axis of the main housing inside the main housing, the fluid distribution member having a fluid inlet aligned with the central axis of the main housing, and further having a fluid delivery opening located for rotational movement into alignment with a selected fluid outlet opening in the main housing to deliver fluid from the inlet of the fluid distribution member to the selected fluid outlet of the main housing; and a drive member for rotating the fluid distribution member and a timer circuit for periodically operating the drive member to rotate the fluid distribution member to cause the fluid delivery opening to be moved into alignment with different selected ones of the plurality of fluid outlet openings in the main housing.

25. The water distribution valve according to claim 24 further including a device providing an indication to the timer circuit of the movement by the fluid distribution member into alignment with a selected one of the plurality of fluid outlet openings in the main housing.

26. The fluid distribution valve according to claim 24 wherein the fluid distribution member comprises a generally T-shaped member, with a vertical base having a top and a bottom with the fluid inlet in the bottom and first and second arms extending from the top of the base of the "T", the first arm including the fluid delivery opening, and the second arm being closed with the arms substantially extending across the diameter of the interior of the main housing.

27. The fluid distribution valve according to claim 26 wherein the fluid delivery opening in the first arm of the fluid distribution member further includes a sealing ring about the fluid delivery opening for engagement with the main housing to provide a fluid-tight seal between the main housing and the fluid distribution member.

28. The fluid distribution valve according to claim 27 wherein the T-shaped fluid distribution member is internally configured with a 90° fluid passage from the fluid inlet to the fluid delivery opening thereof in the first arm thereof, and with the second arm thereof being closed.

29. The fluid distribution valve according to claim 28 wherein the second arm of the T-shaped fluid distribution member is made of solid material.

30. The fluid distribution valve according to claim 29 further including a wear bar on the exterior of the second arm of the fluid distribution member for engagement with said main housing to counter forces generated by fluid passing through the fluid distribution member to the fluid delivery opening and to decrease friction between the second arm of the fluid distribution member and the main housing.

31. The fluid distribution valve according to claim 30 wherein the wear bar on the second arm of the fluid distribution member comprises an elongated cylinder located in a corresponding opening in the end of the second arm of the main housing and having an axis parallel to the central axis of the main housing.

32. The fluid distribution valve according to claim 31 wherein the wear bar is made of ultra-high molecular weight polyethylene material.

* * * * *